Sept. 16, 1941.  G. H. SCHIEFERSTEIN  2,255,820
OSCILLATING MECHANICAL SYSTEM OF THE RESONANCE TYPE
Filed Oct. 20, 1938  3 Sheets-Sheet 1
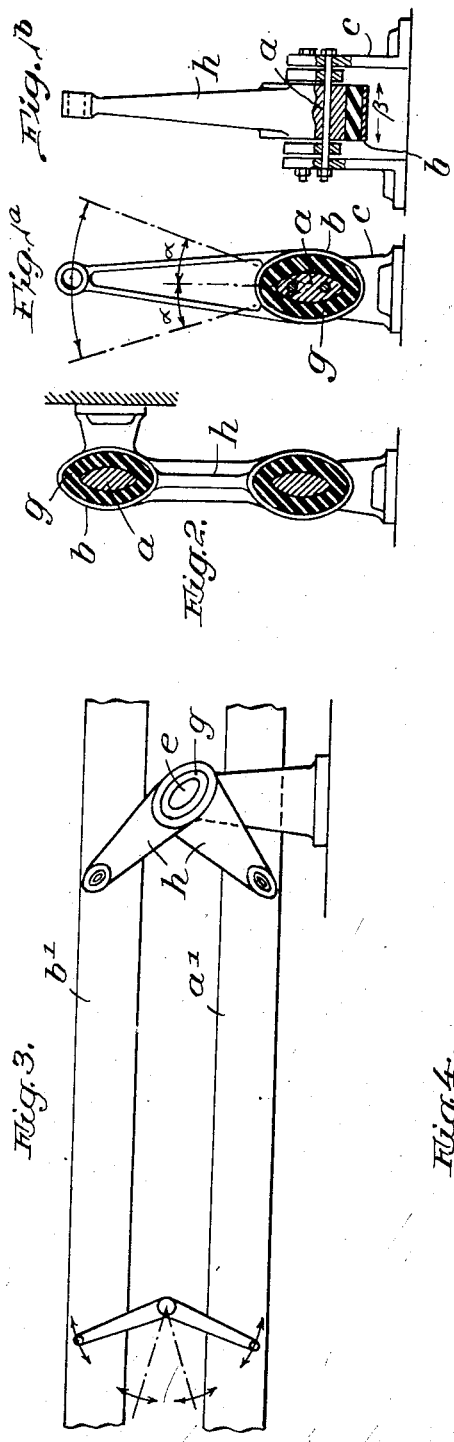
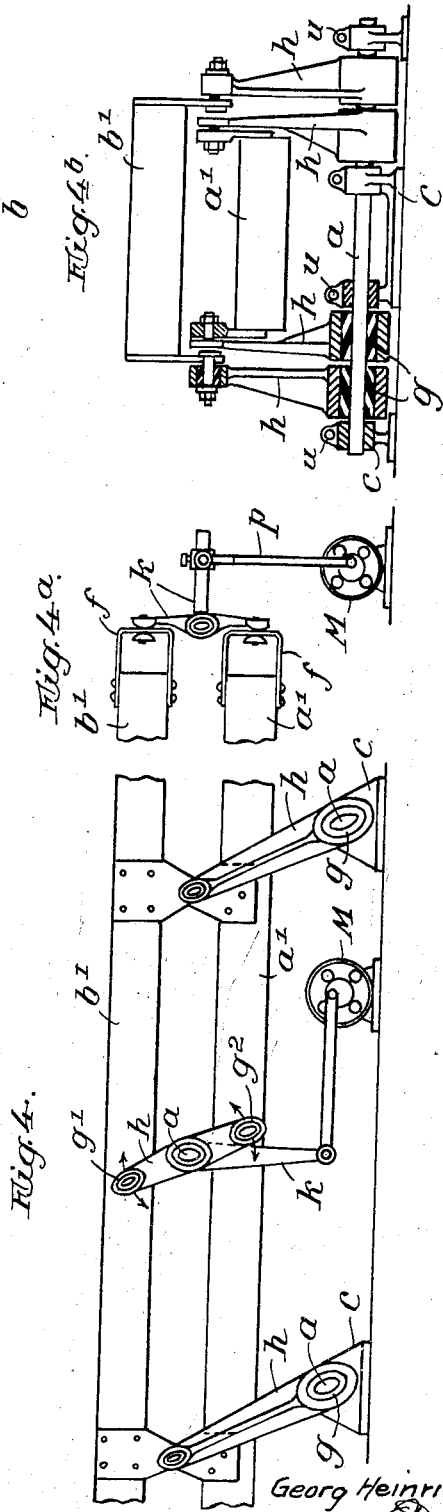
INVENTOR
Georg Heinrich Schieferstein
By Otto Munk
his ATT'Y.

Sept. 16, 1941.     G. H. SCHIEFERSTEIN     2,255,820
OSCILLATING MECHANICAL SYSTEM OF THE RESONANCE TYPE
Filed Oct. 20, 1938     3 Sheets-Sheet 2
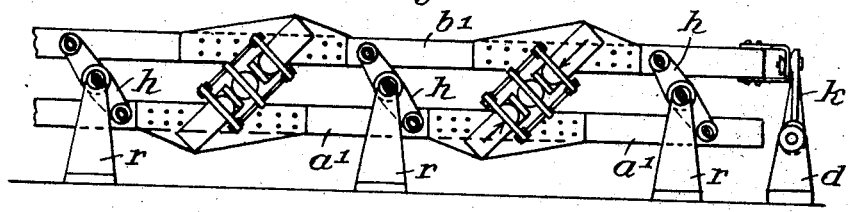
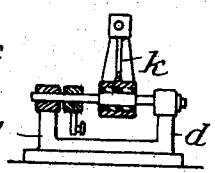
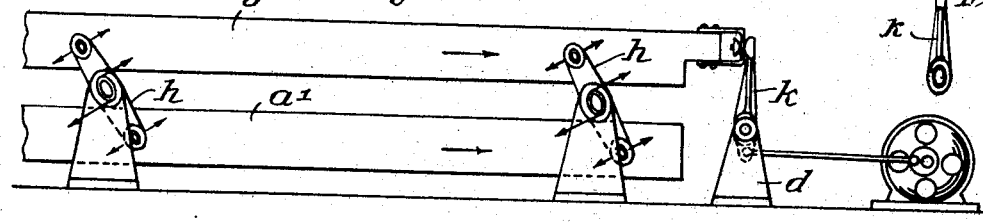
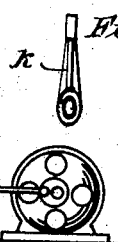
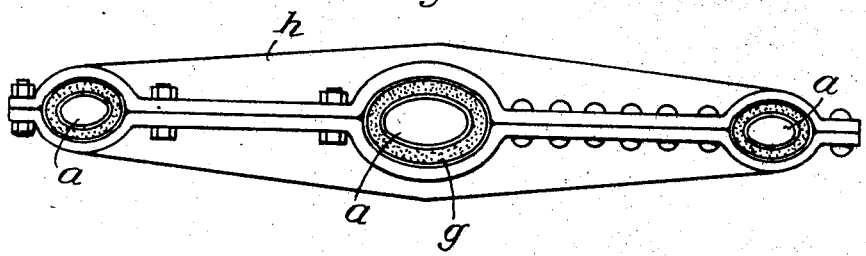
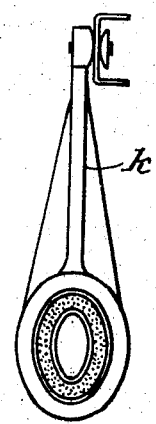
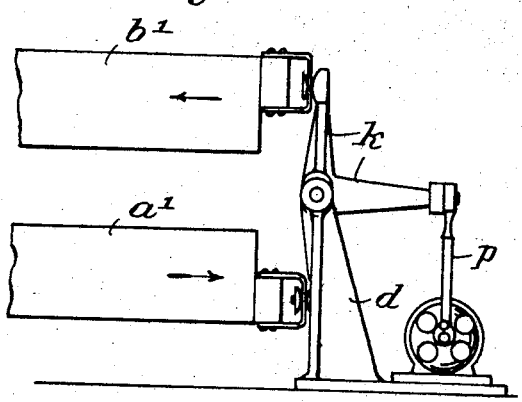
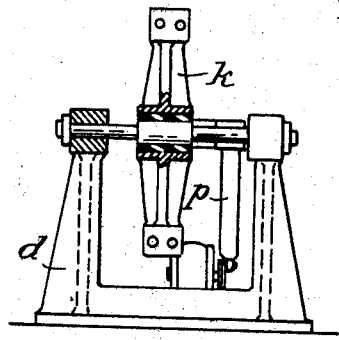
Inventor:
Georg Heinrich Schieferstein
By Otto Munk
His Atty.

Sept. 16, 1941.  G. H. SCHIEFERSTEIN  2,255,820
OSCILLATING MECHANICAL SYSTEM OF THE RESONANCE TYPE
Filed Oct. 20, 1938   3 Sheets-Sheet 3
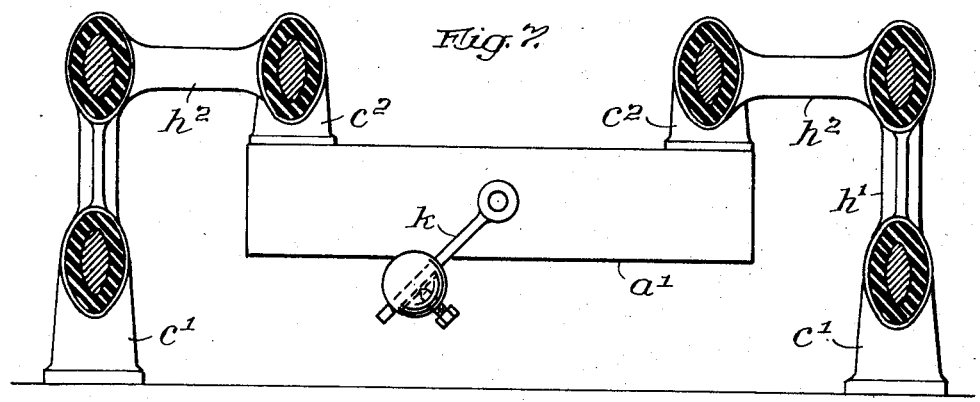
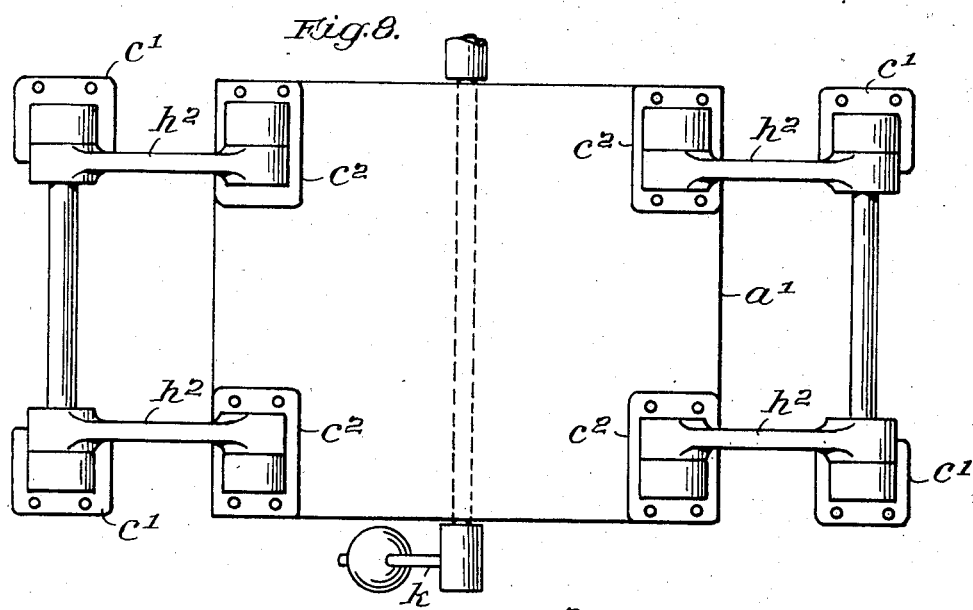
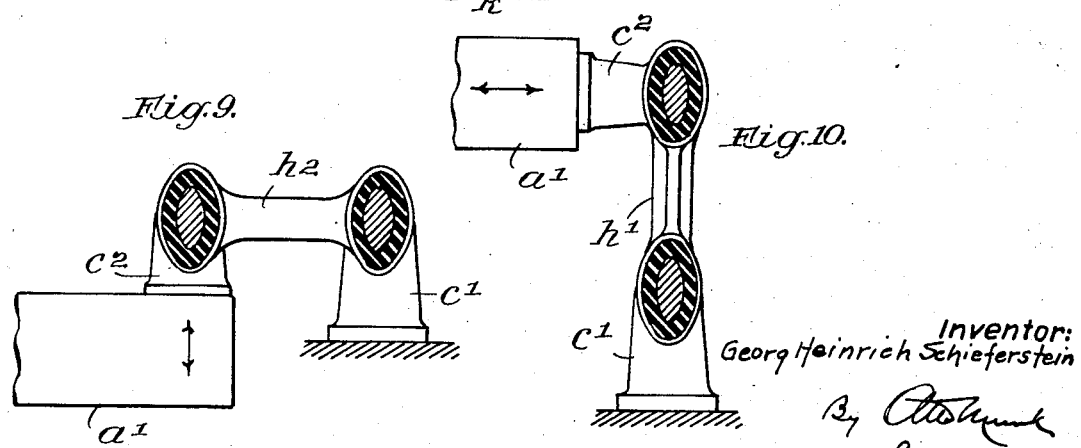
Inventor:
Georg Heinrich Schieferstein Patented Sept. 16, 1941

2,255,820

UNITED STATES PATENT OFFICE 2,255,820

OSCILLATING MECHANICAL SYSTEM OF THE RESONANCE TYPE

Georg Heinrich Schieferstein, Finowfurt, near Eberswalde, Germany

Application October 20, 1938, Serial No. 235,991 In Germany July 12, 1937

4 Claims. (Cl. 267—21)

This invention relates to oscillating mechanical systems of the resonance type.

It is known that only relatively little energy could heretofore be accumulated, per oscillation or semi-oscillation, in resonance mechanisms and machines, and that, in consequence, for the purpose of increasing the energy, either very many elastic means or very high frequencies of oscillation had to be employed.

In the specification of my copending application Ser. 144,319 I have described a spring which, while of most simple form, was able to be judged in respect of its intrinsic character only after measurements had been made.

In making such measurements, it was found that 210,000 cm.-kgs. of energy can be accumulated in this novel type of elliptical spring with the minor axis measuring 140 mms., the major axis 160 mms., and the length 220 mms.

Since springs of this type can also be constructed with far greater dimensions and can also be employed in larger numbers per resonance mechanism, their capacity for storing energy is so enormous that, in accordance with the idea underlying the present invention, resonance machines and mechanisms can be constructed for outputs the limits of which are at present still unknown.

The present invention consequently contemplates the employment of elastic means of the foregoing kind (of rubber or equivalent materials) in resonance mechanisms capable of storing periodic amounts of energy and, when set in oscillation, furnishing pseudo-harmonic oscillations of any desired degree.

The invention also consists in the application of such springs in prime movers and machines performing work, and also in apparatus and tools.

The invention is illustratively exemplified in the accompanying drawings, in which Fig. 1a shows a spring element of the type to be used according to the invention in elevation and partly in section, Fig. 1b is an end view partly in section of the same arrangement.

Fig. 2 is an elevational view partly in section, of a spring arrangement particularly adapted for resonance mechanism.

Fig. 3 is a partial elevational view of a first type of resonance mechanism according to the invention.

Fig. 4 is a similar elevational view of a second type of resonance mechanism.

Fig. 4a illustrates a modification of the coupling for the mechanism of Fig. 4.

Fig. 4b is an end view of the arrangement of Fig. 4 partly in section.

Fig. 5 is an elevational view of a screening device constructed according to the invention.

Fig. 5a is an end view of Fig. 5 partly in section.

Fig. 5b is a side elevation of a detail in Fig. 5.

Fig. 6 is an elevational view of another embodiment of a resonance mechanism according to the invention, Fig. 6a shows a modification of one of the spring members of the arrangement of Fig. 6 on a larger scale partly in elevation and partly in section, Fig. 6b illustrates in a similar way a modification of the main coupling lever, Fig. 6c is an elevation of a driving coupling similar to that of Fig. 6, Fig. 6d is a cross-section of the driving coupling of Fig. 6c.

Figs. 7 and 8 are an elevational view, partly in section and a top plan view, respectively, of still another embodiment of a resonance mechanism according to the invention, and Figs. 9 and 10 are elevational views partly in section of modified spring arrangements.

Referring now to the drawings and first to Figures 1 and 1a, $G$ denotes an elliptical or annular rubber ring, $a$ the interior metal ellipse, $b$ the outer elliptical shell, $h$ the long leverage arm of the spring, and $c$ the mounting bracket by means of which the spring can be attached to the foundation or to the machine as required.

It is immaterial whether the bracket $c$ is firmly secured to the inner elliptical core $a$, or to the outer elliptical ring $b$. The same applies to the lever $h$, which can be joined either to the inner core $a$ or to the outer elliptical ring $b$.

In the unstressed condition, i. e., in the central position, such a spring assumes the position AB, as shown in Fig. 1.

If the spring be deflected towards the left, tension, compression and shearing stresses are set up in the interior of the elastic device or devices, with corresponding resistances by means of which the axis-ratio of the ellipse, or lenticular member, or its dimensions, in respect of size and travel, can be varied within a wide range.

It has been found to be particularly favourable that the course of the internal resistances of the rubber should increase progressively with the rotational moment. The increase in the stresses is the more rapid in proportion as the ratio between the major and minor axes is higher, that is to say, the oscillation becomes more and more inharmonic, the higher said ratio—other conditions being unchanged.

This also correspondingly applies to the lenticular or other equivalent form of the springs described in the specification of my co-pending application No. 144,319.

The value of the resistance varies as the square of the width $\beta$ of the rubber ring in Fig. 1.

The resistance of the rubber ring also varies with the thickness of its material, a greater thickness setting up a smaller resistance, and a smaller thickness a higher resistance, under otherwise equal conditions.

All these possible variations offer the advantageous possibility of attaining any desired effect by means of springs of this type.

Whilst the end of the leverage arm of the spring shown in Fig. 1 is designed as a link, of desired form, the spring shown in Fig. 2 is specially adapted for resonance mechanisms, because the second pivot point of the lever is also in the shape of an elliptical spring.

This affords the advantage that the oscillation proceeds quite quietly and noiseless, and the machine does not have to be lubricated at any point.

Fig. 3 illustrates diagrammatically a resonance mechanism in which two masses $a_1$ and $b_1$ are adapted to swing, against or with one another, depending on the actuation of the loose coupling.

This arrangement is only partly balanced in respect of forces and inertia effects.

On the other hand, the arrangement shown in Fig. 4 can be fully balanced, in known manner, provided the movement proceeds in a direction determined by a straight line connecting the two centres of gravity of the two masses $a_1$ and $b_1$. In this case, the coupling can be so arranged, by using elliptical springs, that the coupling lever $k$ is firmly connected with an elliptical shaft $a$. This shaft projects into the central rubber ellipses of two coupling levers $h$, arranged on either side of the oscillating device, and sets the said levers $h$ in oscillation inasmuch as through the connection of the elliptical inner axes, forces are generated (in the direction shown by the arrows) which are transmitted, through the rubber ellipses $g_1$ and $g_2$, to the masses $a_1$ and $b_1$.

Another type of coupling is shown in Fig. 4a.

In this case, the coupling forces are transmitted—by the agency of elastic springs $f$—from the driving motor M, through the coupling lever $k$, which turns—with interposition of elliptical rubber rings—on a fixed axis $a$.

A cross-section of the arrangement shown in Fig. 4 is shown in Fig. 4b, from which it can be seen that the mass $a_1$ and the mass $b_1$ are mounted in two levers rocking on a shaft $a$ which is firmly clamped by the bearings $u$.

The oscillating device can be employed as a through conveyor or screen, for which purpose the levers are set obliquely so that they can transport the super-imposed material to be conveyed or screened, in one direction, after the manner of a shovel.

As can be seen from Fig. 4, the upper bearings of the levers $h$ may be designed either as journal bearings or as elliptical rubber bearings.

In both cases, these bearings are solely guide bearings, intended to guide the mass $a_1$ or $b_1$ in such a manner that said shovelling action is obtained. They may therefore, as in the example shown in Fig. 1, be of comparatively light construction.

When large forces have to be transmitted, springs of the type shown in Fig. 2 may, however, also be employed. In this case, the resistance is doubled, and the idle energy increases accordingly, which may be desirable in certain circumstances.

Fig. 5 shows a screening device in which the mass swings, in known manner, between rubber calottes and is articulated by levers $h$ with interposition of very soft elliptical rubber rings.

The rubber calottes describe inharmonic oscillations and transmit the great forces of the swinging mass, while the guiding devices have only to hold the masses $a_1$, $b_1$ in their desired position.

By comparison with Fig. 6 the arrangement in Fig. 5 is more expensive and complicated in construction and operation than that shown in Fig. 6, in which latter, the rubber members are so stoutly designed as to be capable of fully taking the oscillating forces of the masses $a_1$ and $b_1$, and at the same time taking over the guiding of the masses.

The lever may consist of two parts riveted or bolted together as shown diagrammatically in Fig. 6a. When greater forces are concerned, it is advisable to construct the ellipse as a solid unit, without subdivision. The central rubber ring can be mounted on a fixed pin, or on a continuous shaft on the foundation brackets $r$.

Under the aforesaid condition that the straight line connecting the centres of gravity of the two masses coincides with the direction of movement, arrangements of this kind are balanced in respect of forces and inertia effects except as regards a torque engaging the inner rubber rings with a very small leverage arm. As already mentioned, complete balancing is attained in the case of Figs. 4, 4a and 4b.

Figs. 6a, 6b and 6c show various coupling or driving means in which elliptical rubber members are appropriately employed. In most cases, an elliptical rotational axis, inside the elliptical rubber ring in the coupling lever $k$, describes oscillations which the coupling lever transmits to the masses $a_1$, $b_1$, either unilaterally or bilaterally, depending on the forces.

In Fig. 7, $a_1$ is an oscillating mass by means of which the coupling $k$, a rotary unbalanced weight, is set in oscillation. $h_1$ are vertically disposed elliptical spring levers, $h_2$ are four horizontal elliptical spring levers, $c_1$ are the four foundation brackets by means of which the springs $h_1$ are secured, on one side, to the foundation and $c_2$ are the fastening brackets by means of which the springs $h_2$ are attached to the mass $a_1$.

It is obvious that such an elastic system of springs $h_1$, $h_2$ is resilient both horizontally and vertically. This means that the mass $a_1$, on being suitably energised, can perform circular oscillations of relatively large diameter, that is, oscillations during which each point of the mass $a_1$ swings in a closed circuit.

If the springs, or the rubber rings of the springs $h_2$, be constructed so as to offer a smaller resistance than the springs $h_1$, then the mass swings in a closed circuit, in the form of an ellipse, the major axis of which is vertical.

If the same experiment be performed with the springs $h_1$, so that the springs $h_2$ exhibit the greater resistance, a swinging movement occurs on a closed circuit in which the major axis is horizontal.

It is also obvious that, when the springs $h_2$ are attached directly to the four foundation brackets $c_1$, there will be a swinging movement along a vertical straight line, according to Fig. 9, and it is also evident that, when the levers $h_1$ are directly mounted on the brackets $c_2$, a horizontal swinging movement must result (Fig. 10).

All these movements, by contrast to those already known, possess the property of being able to swing, with any desired smaller or larger amplitude, depending on the length of the lever arms and the energising forces, so that any desired amounts of energy can be transmitted, no matter whether the oscillations take place on a closed circuit, a straight line or an open curve.

The extraordinary advantage thus afforded by the new resonance mechanism by the use of elliptical springs, consists in that the range of output is so extended in all directions that the designer is enabled, for the first time, to fulfill with ease the following conditions:

(1) He can dimension the springs in accordance with any requirements.

(2) He can in all cases give the loose coupling such dimensions that they can transmit the desired powers without endangering any member, and (3) He can in all cases arrange the idle energy in such a manner, in relation to the real performance, that an optimum action is obtained, in accordance with the effect desired.

Hitherto, all these desires have been frustrated by the limitations imposed by the power accumulating capacity of the elastic means.

The importance of the invention resides in that the springs enable forces and paths of any desired magnitude to be employed, thereby enabling the resonance mechanisms and machines to be in this respect fully adjusted to the work to be performed, and also that the progressively increasing resistance of the springs can be accurately graduated in accordance with the requirements, in the case of prime movers, machines performing work, apparatus and tools, so that the problems encountered can be solved in such a manner as to attain an optimum effect.

I claim:

1. In a resonance mechanism having a fixed element and a vibrating mass element, connecting means between said two elements including a lever and an elliptical spring on each end of said lever, each of said springs comprising a substantially elliptical metal core member, a substantially elliptical metal shell member surrounding said core member at a distance from its surface, and an intermediate layer of soft rubber interposed between said core and shell member and adapted to store substantial amounts of energy, one of the metal members of each spring being rigid with said lever, the second metal member of each spring being connected to one of said two elements, respectively.

2. A resonance mechanism, as claimed in claim 1, in which said connecting means includes further a second lever having one end thereof rigid with the second metal member of one of said springs to normally extend at right angles to said first lever, the other end of said second lever being connected to one of said elements.

3. A resonance mechanism, as claimed in claim 1, in which said connecting means includes a second lever having one end thereof rigid with the second metal member of one of said springs to normally extend at right angles to said first lever, and a further elliptical spring of the type described having one of its elliptical metal members rigid with the other end of said second lever and its second elliptical metal member being connected to one of said elements.

4. In a resonance mechanism, having a fixed element and two mass elements adapted to oscillate relative to the fixed element and to one another, means to connect the two oscillating elements with each other and with the fixed element, said means including a two-armed lever, and an elliptical spring at the end of each lever arm and at the pivot point of the lever, each of said springs comprising a substantially elliptical metal core member, a substantially elliptical metal shell member surrounding said core member at a distance from its surface, and an intermediate layer of soft rubber interposed between said core and shell members, one of the metal members of each spring being rigid with said lever, the other metal member being connected with one of said elements.

GEORG HEINRICH SCHIEFERSTEIN.